United States Patent [19]
Guillot

[11] Patent Number: 5,644,000
[45] Date of Patent: Jul. 1, 1997

[54] CRYSTALLIZATION RESISTANT, LOW MODULUS ELASTOMER FOR FLEXIBLE BEARINGS

[75] Inventor: David G. Guillot, Tremonton, Utah

[73] Assignee: Thiokol Corporation, Ogden, Utah

[21] Appl. No.: 322,273

[22] Filed: Mar. 10, 1989

[51] Int. Cl.$^6$ .................. C08L 9/00; C08L 7/00
[52] U.S. Cl. .................. 525/236; 525/192; 524/314; 524/526
[58] Field of Search .................. 525/192, 236; 524/314, 526

[56] References Cited

U.S. PATENT DOCUMENTS

| | | | |
|---|---|---|---|
| 2,363,654 | 11/1944 | Daly | 525/236 |
| 3,060,989 | 10/1962 | Railsback et al. | 525/236 |
| 3,159,691 | 12/1964 | Kraus | 525/236 |
| 3,817,954 | 6/1974 | Kawakami | 526/340 |
| 4,119,588 | 10/1978 | Carpino | 525/236 |
| 4,198,324 | 4/1980 | Lal et al. | 525/232 |
| 4,433,107 | 2/1984 | Takeuchi et al. | 525/236 |

*Primary Examiner*—Richard D. Lovering
*Attorney, Agent, or Firm*—Madson & Metcalf; Ronald L. Lyons

[57] ABSTRACT

A low shear modulus vulcanizate for construction of flexible bearings, particularly for rocket motors, consisting essentially of a mixture of two natural or synthetic rubber copolymers, the first having about 92% cis-1,4-polyisoprene and about 8% trans-1,4-polyisoprene moieties and the second having about 98% by weight cis-1,4-polyisoprene and about 2% by weight trans-1,4-polyisoprene moieties. The composition is lightly filled and contains a low proportion of sulfur, so the vulcanizate has the required low shear modulus, low rate of thermal crystallization at low temperatures, and an acceptably high shear strength.

5 Claims, 1 Drawing Sheet

U.S. Patent     Jul. 1, 1997     5,644,000
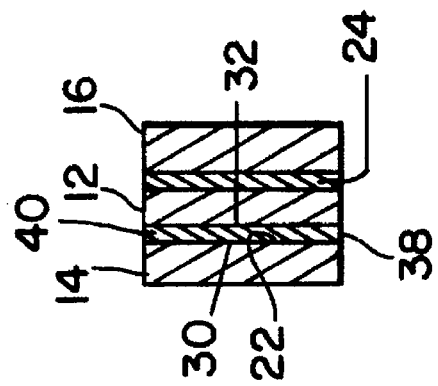
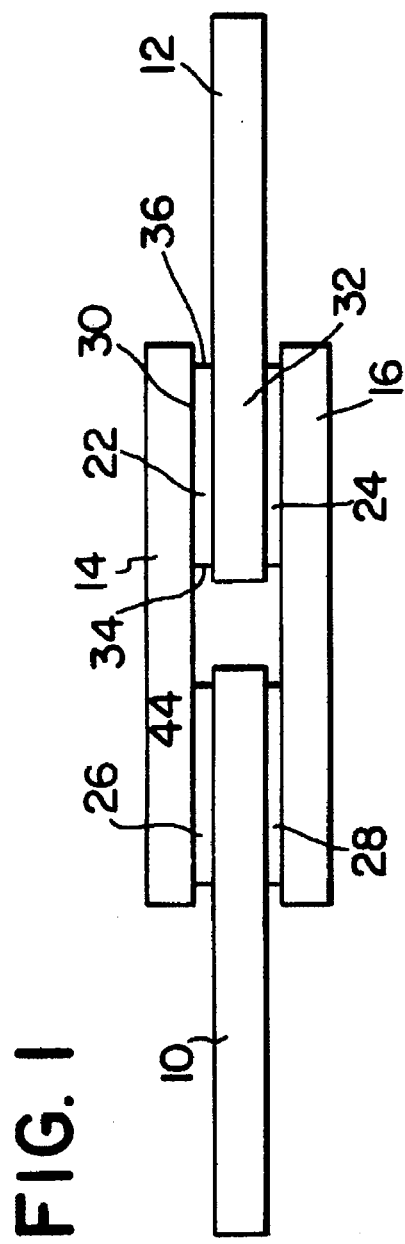
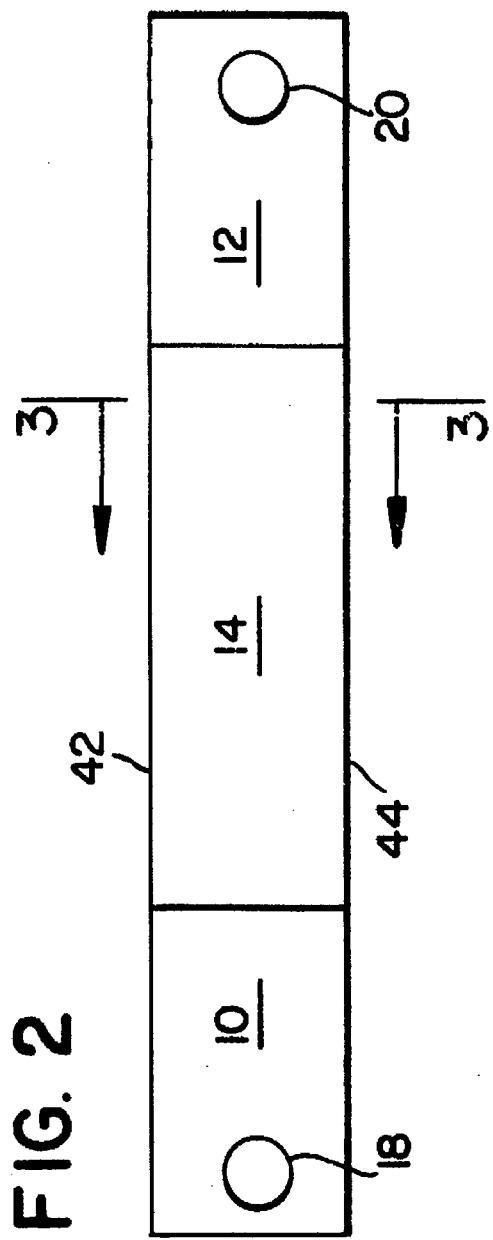

CRYSTALLIZATION RESISTANT, LOW MODULUS ELASTOMER FOR FLEXIBLE BEARINGS

TECHNICAL FIELD

This invention relates to low shear modulus rubber compositions for fabrication of flexible laminated bearings capable of being used and stored at temperatures substantially below 70° F. (21° C.), particularly below about 32° F. (0° C.).

BACKGROUND ART

An annular, flexible, laminated bearing is disposed about a concentric axis and has an outer edge secured to a first structure and an inner edge encircling and secured to a second structure which normally lies along the bearing axis. The second structure can be rotated fractionally with respect to the first structure about an axis of rotation intersecting the bearing axis, somewhat like a clapper rotates with respect to the mouth of a bell. Such bearings typically are constructed of laminated alternate layers of an elastomer having a low shear modulus and a rigid material such as machined steel. Each lamina is disposed on the surface of a sphere centered at the intersection of the bearing axis and the axis of rotation, or on a conic section or cylinder centered on the intersection. In such a structure, individual lamina can accommodate fractional rotation of the second structure by shifting in their plane (or more precisely, along the surface of the cylinder, sphere or conic section on which they lie), while accommodating very little movement in a direction normal to the lamina (tending to pull the lamina apart or push them together). The following patents discuss such bearings and their construction and use: U.S. Pat. No. 3,429,622, issued to Lee et al on Feb. 25, 1969; U.S. Pat. No. 3,941,433, issued to Dolling et al on Mar. 2, 1976; and U.S. Pat. No. 4,395,143, issued to Bakken et al on Jul. 26, 1983. Those patents are hereby incorporated herein by reference to show the utility, structure, and methods of fabricating flexible bearings. Such bearings are used in rocket motors to secure a thrust nozzle to a relatively fixed casing so the nozzle can be steered to direct thrust either parallel to the longitudinal axis of the rocket body or along a skewed axis. Such laminated bearings also find many other uses, for example, for supporting a skewable drive shaft.

The most common material for the elastomeric components of such bearings is a low shear modulus, Hevea (natural) rubber formulation containing low levels of sulfur and fillers. Hevea rubber or its closest synthetic substitutes are essentially pure cis-1,4-polyisoprene (98%), and contain little or no 1,2-polyisoprene, 3,4-polyisoprene or trans-1,4-polyisoprene. An important characteristic of compositions consisting almost entirely of cis-1,4-polyisoprene is their tendency to crystallize. Cis-1,4-polyisoprene exhibits strain crystallinity when it is under stress, which gives it highly desirable physical properties including a high shear strength for a low shear modulus composition.

Unfortunately, Hevea rubber or other high cis-1,4-polyisoprene compositions are also susceptible to thermal crystallization when maintained substantially below room temperature. Thermally crystallized cis-1,4-polyisoprene does not have the desirable low shear modulus necessary to flex when a minimal load is exerted against the thrust nozzle. Kirk-Othmer's Encyclopedia of Chemical Technology (3rd Edition), Vol. 20, page 472, indicates that Hevea rubber thermally crystallizes at an appreciable rate below about 20° Celsius, with the rate depending on the temperature. At 8° C., crystallization will be evident after about one month, while at minus 26° C. Hevea rubber hardens in a few hours. Thus, when a rocket motor or other structure is stored at a cold ambient temperature, the rubber composition may crystallize so much that the flexible bearing will no longer function properly until its temperature increases substantially.

The other type of natural (and corresponding synthetic) rubber which is capable of crystallizing is trans-1,4-polyisoprene, the naturally derived manifestations of which are balata and gutta percha. This isomer is highly crystalline, thermoplastic, and hard.

The problem of thermal crystallization of cis-1,4-polyisoprene cannot be solved by changing the proportions of non-rubber additives. If more sulfur is added to the composition, the greater amount of cross-linking upon vulcanization tends to prevent the development of thermal crystallinity at low temperatures, but also increases the shear modulus of the rubber composition to an unacceptable level for use in laminated bearings.

Andrews, et al., "Microkinetics of Lamellar Crystallization in a Long Chain Polymer", Rubber Chemistry and Technology, Vol. 45, pp 1315–1333 (1972), demonstrates that, for unvulcanized compositions, the isomerization of essentially pure cis-1,4-polyisoprene to provide a copolymer containing trans-1,4-polyisoprene slows down the rate of thermal crystallization of the composition greatly. But that reference employs unvulcanized compositions, which are unsuitable for making flexible, laminated bearings, to show the effect of isomerization on crystal growth rates as a function of temperature.

Mixtures and copolymers of cis-1,4-polyisoprene and trans-1,4-polyisoprene are known. Besides the Andrews article, the most pertinent references are believed to be U.S. Pat. No. 3,817,954, issued to Kawakami et al. on Jun. 18, 1974 (see Tables 4, 7, and 9); and U.S. Pat. No. 2,363,654, issued to Daly (page 1, column 2). The Kawakami et al. reference can be distinguished because it suggests materials having a substantially higher modulus than is useful here. The Daly patent can be distinguished because it indicates on page 1, from column 1, line 46 to column 2, line 7, that the product produced is hard and thermoplastic, unlike the present, low shear modulus compositions. The isomerized rubber of Daly evidently is a copolymer of cis-1,4-polyisoprene and trans-1,4-polyisoprene moieties. Many such compositions are distinguished by the presence of a substantial proportion of 1,2-polyisoprene or 3,4-polyisoprene, which degrade the physical properties of the composition.

Several other references, believed to be less pertinent than the foregoing, are as follows:

| U.S. Pat. No. | Inventor | Issued |
| --- | --- | --- |
| 3,060,989 | Railsback, et al. | 10/30/62 |
| 3,488,341 | Fischer et al. | 01/06/70 |
| 3,661,883 | Nishida, et al. | 05/09/72 |
| 3,676,416 | Makimoto | 07/11/72 |
| 3,687,925 | Fukui | 08/29/72 |
| 4,035,444 | Yang | 07/12/77 |
| 4,130,606 | Van Ballegooijen, et al. | 12/19/78 |
| 4,385,151 | Furukawa, et al. | 05/24/83 |
| 4,414,363 | Akita, et al. | 11/08/83 |
| 4,430,487 | Sandstrom | 02/07/84 |
| 4,433,107 | Takeuchi, et al. | 02/21/84 |
| 4,461,883 | Takeuchi, et al. | 07/24/84 |
| 4,521,587 | Furukawa, et al. | 06/04/85 |

Kirk-Othmer, Encyclopedia of Chemical Technology, 3d Ed., Vol. 13, page 827 (1981).

Particular elastomeric bearing compositions taught in the prior art are found in the previously cited Bakken et al. (column 2) and Dolling et al. (column 2) references.

SUMMARY OF THE INVENTION

One aspect of the present invention is a vulcanized rubber composition for flexible bearings, which will not substantially thermally crystallize when held at 0° C. for 28 days. (The term "will not substantially thermally crystallize" used herein refers to a composition whose hardness will not increase more than 2 units on the Shore A Durometer scale (both hardnesses being measured at the storage temperature) between the beginning and the end of a 28 day storage period. The composition has a shear modulus of from about 16 to about 27 psi (from about 11 to about 18.6N/cm$^2$) at 70° F. (21° C.) and at a crosshead speed of 0.5 inches (1.27 cm) per minute, and a high degree of strain crystallization, manifested as a shear strength of from about 700 to about 1000 psi (about 483 to about 690N/cm$^2$) at 70° F. (21° C.) and at a crosshead speed of 0.5 inches (1.27 cm) per minute. The composition is the vulcanizate of a mixture of from about 60 to about 80 parts per 100 parts rubber by weight (phr) of a first random copolymer of about 92% by weight cis-polyisoprene and about 8% by weight trans-1,4-polyisoprene and any other non-cis-1,4-polyisoprene moieties and from about 20 to about 40 phr of a second random copolymer of at least about 98% by weight cis-1,4-polyisoprene and at most about 2% by weight trans-1,4-polyisoprene and any other non-cis-1,4-polyisoprene moieties. The remainder of the composition can be about 10 phr of a plasticizer such as dioctyl adipate, about 7 phr of fillers, and about 1.1 phr of sulfur as a vulcanizing agent. The low rate of thermal crystallization at a low temperature, the good shear strength, and the low shear modulus of this composition make it an ideal formulation for flexible bearings of the type described herein. Surprisingly, the suppression of thermal crystallization does not adversely affect the strain crystallization, and thus the shear strength, of the composition.

A second aspect of the invention is a process for fabricating a flexible bearing, comprising the steps of providing the previously stated rubber composition in an unvulcanized state, forming a flexible bearing from the composition and rigid bearing members, and vulcanizing the formed bearing. This process provides the vulcanized composition previously stated in situ. The resulting flexible bearing is usable after being stored 28 days at a temperature of 0° C. or above because the rubber in it is not substantially thermally crystallized by such storage. The lower degree of thermal crystallization in the flex bearing also allows a smaller actuator to be specified to flex the thrust nozzles of the motor after it is stored cold, thus saving weight which does not contribute to the specific impulse of the motor.

BRIEF DESCRIPTION OF DRAWINGS

FIG. 1 is a side elevation of a specimen used for measuring the shear strength and shear modulus of an elastomer.

FIG. 2 is a plan view of the specimen.

FIG. 3 is a section taken along line 3—3 of FIG. 2.

The reference characters in the Figures are assigned as follows:
10 steel plate (end)
12 steel plate (end)
14 steel plate (side)
16 steel plate (side)
18 perforation
20 perforation
22 pad
24 pad
26 pad
28 pad
30 1st major face of 22
32 2nd major face of 22
34 1st minor face of 22
36 2nd minor face of 22
38 3rd minor face of 22
40 4th minor face of 22
42 side edge of 14
44 side edge of 14

DETAILED DESCRIPTION OF THE PREFERRED EMBODIMENTS

Rubber compositions according to the present invention consist essentially of from about 60 phr to about 80 phr, preferably from about 65 phr to about 75 phr, more preferably from about 69 phr to about 72 phr, of a first random copolymer as identified herein and from about 20 phr to about 40 phr, preferably from about 25 phr to about 35 phr, more preferably from about 28 phr to about 31 phr of a second random copolymer as identified herein.

The preferred rubber composition according to the present invention has the composition stated in Table I. NATSYN 2200, identified in Table I, is a random copolymer of about 98% by weight cis-1,4-polyisoprene and about 2% by weight trans-1,4-polyisoprene moieties. This is essentially the isomeric composition of Hevea rubber. A composition having more than 98% cis-1,4-polyisoprene moieties is also contemplated to be useful herein. The GARAFLEX material identified in Table I is a random copolymer of about 92% by weight cis-1,4-polyisoprene and about 8% by weight trans-1,4-polyisoprene moieties, modified with 25 phr of a nonstaining naphthenic oil. Although it is postulated that CARAFLEX alone would be superior to the combination of rubbers for resisting thermal crystallization at low temperatures, the CARAFLEX material taken alone is too sticky to be readily processed. This problem is alleviated by the addition of the NATSYN material.

Zinc oxide and carbon black function in the composition as pigments. Zinc oxide is also part of the sulfur vulcanization system. The composition contains essentially no fillers, unlike other, higher shear modulus rubber formulations. The sulfur content is also quite low in relation to the sulfur content of higher modulus formulations.

All the ingredients recited above are thoroughly blended in a mechanical mixer of convenient size. All of the non-elastomeric parts of the bearing are positioned in a mold assembly, and the assembly and the rubber composition are each heated to about 200° F. (93° C.), the temperature at which the fluidity of the rubber composition is greatest. The rubber composition is cast or otherwise inserted into the spaces between the rigid layers of the assembly, then it is cured, commonly under pressure as described in the previously incorporated flexible bearing patents. The assembly is removed from the mold and any excess elastomer is trimmed. The cured elastomer has the properties identified in the Summary of the Invention above.

Shear Modulus and Shear Strength

The measuring and testing equipment employed herein is calibrated according to MIL-STD-45662. A minimum of eight quadruple lap shear (QLS) specimens, as shown in FIGS. 1–3, are prepared for each determination of shear strength and shear modulus.

The specimens comprise machined steel plates 10, 12, 14, and 16, of which 10 and 12 will be referred to herein as end plates and 14 and 16 will be referred to as side plates. Each end or side plate is 3.000±0.025 inch (76.20 mm.±0.64 mm) long, 1.000 inch±0.005 inch (25.40 mm±0.13 mm) wide, and 0.2495 inch±0.0015 inch thick (6.337 mm±0.038 mm thick). End plates 10 and 12 have perforations 18 and 20 therein. Elastomer pads 22, 24, 26, and 28 are identical rubber samples whose properties are being evaluated. Each pad, for example 22, has first and second major faces 30, 32 which are respectively glued to one side plate such as 14 and one end plate such as 12. The distance between these first and second major faces is measured for each sample, and is nominally 0.036 inches (0.91 mm). The distances between first and second minor faces 34 and 36 and between first and second minor faces 38 and 40 are each nominally one inch (25 mm).

The specimens are assembled as follows. First, plates 10–16 are decreased in inhibited 1,1,1-trichloroethane vapor for a minimum of 10 minutes and are allowed to dry for a minimum of ten additional minutes. Any remaining visible contamination on the mating surfaces of steel plates 10–16 is removed by grit blasting with 100 to 200 mesh (U.S. Standard sieve series) zirconium silicate. Any remaining grit is removed by wiping plates 10–16 with methyl ethyl ketone. The plates are then allowed to dry for a minimum of 15 minutes at 80°±20° F. (27° C.±11° C.). The steel plates are arranged as shown in the Figures. The thickness of each set of plates is measured to an accuracy of ±0.001 inch (0.025 mm).

The specimens are primed with a chlorinated rubber-based primer applied to each mating steel surface. The primer is allowed to dry for a minimum of 15 minutes at 80°±20° F. (27° C.±11° C.). A chlorinated rubber-based adhesive was applied to each primed surface. The adhesive is allowed to dry for a minimum of 30 minutes at 80°±20° F. Uncured rubber specimen pads 22–28 are cleaned with reagent grade toluene, wiped with a cloth, and allowed to dry in air for 30 minutes before fabricating the specimen. Each specimen is placed in a mold made of aluminum which provides only slight clearance of side edges such as 42 and 44 of steel plate 14. The mold allows compression to be exerted freely between plates 14 and 16.

A press is preheated to bring an instrumented blank mold to 295°±5° F. (146°±3° C.). The platens of the press are brought into contact with the specimen and the mold, which seats the specimen in the mold. The specimen is "soaked" (heated without exertion of substantial pressure) for 5±1 minute. Then the press is actuated to provide 25,000±5,000 pounds (1.112±0.22×10⁵ Newtons) of force to form and cure pads 22–28. The test specimen is then removed from the mold and allowed to post cure at 75°±5° F. (24°±3° C.) for a minimum of 16 hours. The final thickness of each of pads 22–28 is calculated by measuring the depth of the entire specimen including steel plates 14 and 16, subtracting the thicknesses of the steel plates, and thus reporting the aggregate thickness of pads 22 and 24 and of pads 26 and 28.

The outboard ends of plates 10 and 12, and particularly perforations 18 and 20, are placed in the grips of a tensile testing machine. The specimen is tested at a crosshead speed of 0.5 inch per minute (0.21 mm per second) or another specified speed until the specimen fails.

Shear modulus at 50 pounds per square inch (34.5N/cm²) and shear strength are given by the expressions:

$$\text{Shear modulus} = A(50)/Cs$$

where:

A=Thickness of two rubber pads, inches (cm)

Cs=crosshead separated at 100 pounds (445N) load, measured in inches (cm)

50=Shear stress, psi (34.5N/cm²)

$$\text{Shear strength} = Lf/2(B)$$

where:

Lf=Chart load at failure, pounds (Newtons)

B=Total surface area of the pads, square inches (cm²)

Average shear modulus is reported to the nearest 0.1 psi, (0.07N/cm²), and average shear strength is reported to the nearest 5.0 psi (3.4N/cm²).

EXAMPLE 1

A 500 pound (227 kg.) batch of the composition of Table I Was prepared in a Stewart-Bolling Mixer and cured at 300° F. (149° C.) for 45 minutes. The resulting material had the shear modulus and shear strength profiles stated in Table II.

A cold temperature hardness test was conducted to determine if crystallization occurred in the composition of Example 1 during storage at low temperatures. Specimens were held at 75° F. (24° C.), 0° F. (–17° C.), –20° F. (–29° C.), and –35° F. (–37° C.) in freezers (except the 75° F. (24° C.) sample) for 28 days and hardness was measured periodically with a Shore Durometer cooled to the storage temperature of the sample.

The 75° F. (24° C.) and 0° F. (–17° C.) tests were completed without incident, but both the –20° F. (–29° C.) and the –35° F. (–37° C.) freezers malfunctioned 15 days into the test, at which time the –20° F. (–29° C.) test was concluded. No crystallization of the samples was observed. After a total of 28 days at –35° F. (–37° C.), the sample had not substantially crystallized. All the measurements ranged between 22 and 25 on the Shore A hardness scale.

EXAMPLE 2 (comparative)

The degree of crystallization was measured for two formulations which were analogous to that of Table I, except that an equivalent weight of Hevea rubber was used in place of the CARAFLEX and NATSYN rubbers.

Shore A Durometer hardness measurements at the storage temperature (using a Durometer instrument cooled to the storage temperature of the sample) were made periodically to determine the degree of crystallization. (The harder rubber becomes, the more it has crystallized; a Durometer reading of 90 was interpreted as complete crystallization of the specimens.) The resulting data is in Table III. Samples of the Hevea rubber formulations held at 15° F. (–10° C.) or lower crystallized completely within about three to seven days. Even at 40° F. (4° C.) the Hevea rubber formulations crystallized completely in about a month.

The hardness of the formulation of Table I according to the present invention did not measurably increase. It has been calculated that the Example 1 formulation has a rate of thermal crystallization 1/250 as great as the rate of the comparable Hevea rubber compositions.

TABLE I

| Ingredient | phr[1] |
|---|---|
| NATSYN[2] 2200 | 29.41 |
| CARAFLEX[3] IR-500: | |
| rubber | 70.59 |
| naphthenic oil | 17.65 |
| Zinc oxide | 5.88 |
| Stearic acid | 3.53 |
| AGERITE resin D[4] | 1.41 |
| Carbon black | 2.35 |
| Dioctyl adipate | 11.76 |
| Sulfur | 1.29 |
| ALTAX[5] | 1.18 |
| Total | 135.05 |

[1]parts by weight per 100 parts rubber (first two ingredients) by weight.

TABLE I-continued

| Ingredient | phr[1] |
|---|---|

[2] trademark of Goodyear Tire & Rubber Co., Akron, Ohio for a synthetic copolymer of 98% cis-1,4-polyisoprene and 2% trans-1,4-polyisoprene, essentially duplicating the isomeric composition of Hevea rubber.
[3] trademark of Shell Chemical Company, Houston, Texas, for a copolymer of 92-93% cis-1,4-polyisoprene and 7-8% trans-1,4-polyisoprene, modified with 25 phr of a nonstaining naphthenic oil.
[4] trademark of B. F. Goodrich Chemical Co., Cleveland, Ohio, for polymerized 1,2-dihydro-2,2,4-trimethylquinoline.
[5] trademark of Goodyear Tire & Rubber Co., Akron, Ohio for benzothiazyl disulfide.

TABLE II

| Rate (in/min) | 0° F. | 35° F. | 70° F. | 110° F. |
|---|---|---|---|---|
| SHEAR MODULUS, (psi) | | | | |
| 0.5 | 18.6 | 20.2 | 23.8 | 24.8 |
| 60 | 22.3 | 21.9 | 21.8 | 24.9 |
| 120 | 24.5 | 23.6 | 21.1 | 26.8 |
| SHEAR STRENGTH, (psi) | | | | |
| 0.5 | 1110 | 1195 | 901 | 575 |
| 60 | 1527 | 1311 | 1018 | 760 |
| 120 | 1451 | 1333 | 1011 | 776 |

| Rate (mm/sec) | −17° C. | 2° C. | 21° C. | 43° C. |
|---|---|---|---|---|
| SHEAR MODULUS (N/cm$^2$) | | | | |
| 0.2 | 12.8 | 13.9 | 16.4 | 17.1 |
| 25 | 15.4 | 15.1 | 15.0 | 17.2 |
| 51 | 16.9 | 16.3 | 14.5 | 18.5 |
| SHEAR STRENGTH (N/cm$^2$) | | | | |
| 0.2 | 765 | 824 | 621 | 396 |
| 25 | 1053 | 904 | 702 | 524 |
| 51 | 1000 | 919 | 697 | 535 |

TABLE III

| Rubber Sample | 2 | 1 | 1 | 1 | 1 | 2 | 1 |
|---|---|---|---|---|---|---|---|
| Temp (°F.): | 70 | 70 | 40 | 15 | 15 | 15 | −13 |
| Temp (°C.): | 21 | 21 | 4 | −10 | −10 | −10 | −25 |
| Time | Hardness (Durometer, Shore A Scale, +1) | | | | | | |
| 0 | 28 | 26 | 24 | 34 | 35 | 37 | — |
| 1 hour | — | — | 25 | — | — | — | — |
| 2 hours | — | — | 26 | — | — | — | — |
| 3 hours | — | — | 26 | — | — | — | — |
| 1 day | 22 | 20 | 26 | 40 | 38 | — | 50 |
| 2 days | 24 | 22 | 26 | 54 | — | — | 85 |
| 3 days | 23 | 22 | 26 | 65 | — | 79 | — |
| 4 days | — | — | — | 77 | 72 | 83 | — |
| 5 days | — | — | — | — | 82 | 92 | — |
| 6 days | 24 | 22 | — | — | 86 | 90 | — |
| 7 days | 24 | 22 | 27 | 89 | 90 | 91 | — |
| 10 days | 24 | 22 | 31 | — | — | 91 | — |
| 14 days | 23 | 21 | 32 | — | — | — | — |
| 16 days | — | — | 32 | — | — | — | — |
| 21 days | — | — | 49 | — | — | — | — |
| 26 days | — | — | 87 | — | — | — | — |

[1] = TR 3005 #1 RSS natural rubber
[2] = SMR-L natural rubber

I claim:

1. A rubber composition which does not substantially thermally crystallize when maintained at 0° C. for 28 days, has a shear modulus of from about 13.8 to about 18.6N/cm$^2$ at 21° C. and at a crosshead rate of 1.27 cm per minute, and has a shear strength of from about 483 to about 690N/cm$^2$ at 20° C. and a crosshead speed of 1.27 cm per minute, consisting essentially of the vulcanizate of:

A. from about 60 to about 80 phr of a first random copolymer of about 92% by weight cis-1,4-polyisoprene and about 8% by weight trans-1,4-polyisoprene moieties; and B. from about 20 to about 40 phr of a second random copolymer consisting essentially of at least about 98% by weight 1,4-cis-polyisoprene and at most about 2% trans-1,4-polyisoprene moieties.

2. The composition of claim 1, further comprising about 1.1 phr of sulfur.

3. The composition of claim 1, comprising from about 65 phr to about 75 phr of said first random copolymer and from about 25 to about 35 phr of said second random copolymer.

4. The composition of claim 1, comprising from about 69 phr to about 72 phr of said first random copolymer and from about 28 phr to about 31 phr of said second random copolymer.

5. A process for providing a rocket motor flexible bearing, comprising the steps of:

A. providing an unvulcanized rubber composition consisting essentially of:

i. from about 60 to about 80 phr of a first random copolymer of about 92% cis-1,4-polyisoprene and about 8% by weight trans-1,4-polyisoprene moieties;

ii. from about 20 to about 40 phr of a second random copolymer of about 98% cis-1,4-polyisoprene and at most abut 2% trans-1,4-polyisoprene moieties moieties;

iii. about 10 phr of dioctyl adipate; and iv. about 1.1 phr of sulfur;

B. forming a rocket motor flexible bearing from said rubber composition; and

C. vulcanizing the rubber of said formed rocket motor flexible bearing whereby the vulcanized rubber of said bearing does not substantially thermally crystallize when maintained at 0° C. for 28 days, has a shear modulus of from about 13.8 to about 18.6N/cm$^2$ at 21° C. and a crosshead rate of 1.27 cm per minute, and has a shear strength of from about 483 to about 690N/cm$^2$ at 21° C. and a crosshead speed of 1.27 cm per minute.

* * * * *